United States Patent [19]

Inaba et al.

[11] 4,163,992
[45] Aug. 7, 1979

[54] DIGITAL VIDEO EFFECTS SYSTEM EMPLOYING A CHROMA-KEY TRACKING TECHNIQUE

[75] Inventors: Masao Inaba; Kazuo Kashigi, both of Tokyo, Japan

[73] Assignee: Nippon Electric Co., Ltd., Tokyo, Japan

[21] Appl. No.: 933,815

[22] Filed: Aug. 15, 1978

[30] Foreign Application Priority Data

Aug. 17, 1977 [JP] Japan ............................ 52-98938

[51] Int. Cl.² ............................................. H04N 5/22
[52] U.S. Cl. ....................................... 358/183; 358/22
[58] Field of Search ........................... 358/183, 180, 22

[56] References Cited

U.S. PATENT DOCUMENTS

| 4,021,841 | 5/1977 | Weinger | 358/22 |
| 4,079,413 | 3/1978 | Yamashita | 358/183 |

Primary Examiner—Richard Murray
Attorney, Agent, or Firm—Hopgood, Calimafde, Kalil, Blaustein & Lieberman

[57] ABSTRACT

A chroma-key tracking system for electronically compressing a television picture to predetermined dimensions and for moving the compressed picture to a specified area on the television screen where the compressed picture is inserted into a second picture present on the screen. The invention advantageously monitors the aspect ratio (the ratio of width to height of a picture frame) of the compressed picture and ensures that the compressed and inserted picture maintains a prescribed standard aspect ratio.

5 Claims, 16 Drawing Figures

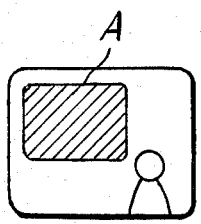 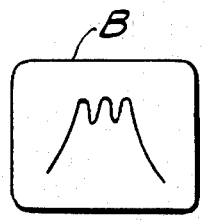 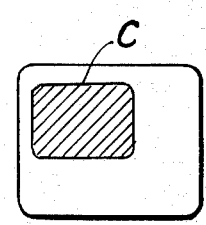 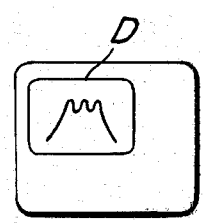 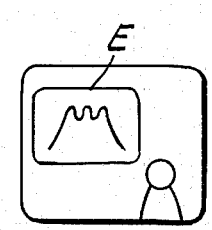
(PRIOR ART) FIG.1A    (PRIOR ART) FIG.1B    (PRIOR ART) FIG.1C    (PRIOR ART) FIG.1D    (PRIOR ART) FIG.1E
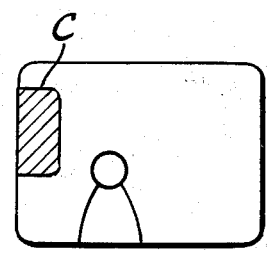 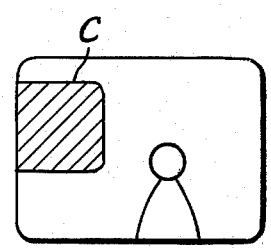
FIG.2A      FIG.2B
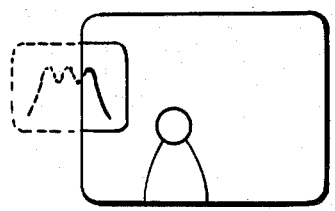 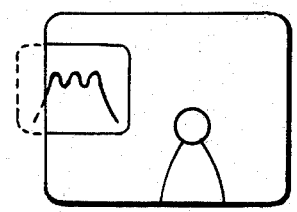
FIG.2C      FIG.2D

DIGITAL VIDEO EFFECTS SYSTEM EMPLOYING A CHROMA-KEY TRACKING TECHNIQUE

FIELD OF THE INVENTION

This invention relates to digital video effects systems, and more particularly to chroma-key tracking systems for electronically compressing and moving a television picture to predetermined dimensions and positions respectively specified by a chroma-key frame in another picture and for inserting the compressed picture into an area corresponding to the chroma-key frame.

BACKGROUND OF THE INVENTION

The so-called key insertion technique, by which a part of one television picture is inserted into another picture to produce a special effect, is frequently used in television broadcasting. One example of such a technique is chroma-key insertion wherein a part of a first picture is designated by a chroma-key signal produced from a second picture and the designated part is inserted into the second picture. However, since a chroma-key signal undergoes a change in position and dimension with the movement of a television camera, employed for the pickup of the second picture, the shooting angle of the camera must be modified accordingly. This involves serious difficulties and to eliminate the difficulties a method has been proposed in which the picture to be inserted is compressed in accordance with the chroma-key signal. (See for example Japanese Patent Publication No. 53-9896). With this technique, the position and dimensions of the picture are determined by comparing the chroma-key frame with a standard television frame.

Referring to FIGS. 1A to 1E, it is assumed that the picture of FIG. 1B is compressed into size of a chroma-key frame shown in FIG. 1C to produce a picture (FIG. 1D) and that the picture of FIG. 1D is inserted into the picture of FIG. 1A to produce the picture of FIG. 1E. In this example, the chroma-key signal representing the chroma-key frame of FIG. 1C serves as the standard signal to designate into what position and to what demensions the picture of FIG. 1B should be compressed. Generally, the chroma-key signal of FIG. 1C is produced by mixing in appropriate proportions of the blue component as a main constituent, out of the various chromatic components (the red, green and blue components) constituting the picture of FIG. 1A, with the two other components. It is therefore customary, when a chroma-key signal is to be produced, to compose the picture of FIG. 1A by leaving blue that part of the picture which is cross-hatched.

Since the aspect ratio (the ratio of the width to the height of a frame) of a television picture is generally prescribed to be 4:3, that of the chroma-key frame of FIG. 1C is naturally set at 4:3. However, when the television camera which picks up picture A, shoots in an oblique direction with respect to the chroma-key frame of FIG. 1C, the aspect ratio of the chroma-key frame will change. This is especially true when the camera is laterally moved and the result is that the chroma-key frame of FIG. 1C, in the picture, may greatly deviate from the standard aspect ratio as shown in FIGS. 2A and 2B. This results in a disadvantage in that the video signal, compressed and inserted into the chroma-key frame, does not have an aspect ratio of 4:3, resulting in an awkward appearing picture. The positional relationship between the chroma-key frame, and the picture to be compressed and inserted, should desirably be such that the picture to be inserted is equally compressed for both height and width. The picture should be without distortion in aspect ratio, as illustrated in FIGS. 2C and 2D and appear as if it were in fact pasted on the chroma-key-frame.

It is therefore an object of the present invention to provide a chroma-key tracking system which, even when the chroma-key frame deviates from the standard aspect ratio, will compress a picture to be inserted into the chroma-key frame with the prescribed aspect ratio.

SUMMARY OF THE INVENTION

In accordance with the advantages and features of the invention, there is provided a tracking system for producing special effects on a television picture by inserting, into a key frame positioned on a first picture relating to a first video signal, a second picture relating to a second video signal which is compressed in accordance with said key frame, said system comprising:

means for producing a key signal representing said key frame, means responsive to said key signal for producing a position signal representing a position of a circumscribed frame of said key frame, means responsive to said position signal for producing an imaginary-frame position signal representing an imaginary frame, said imaginary frame being identical in aspect ratio to said first and second pictures, means responsive to said second video signal and said imaginary-frame position signal for producing a compressed second video signal representing a compressed second picture, said compressed second picture being identical in size to said imaginary frame, and means for selectively gating said first video signal and said compressed second video signal in response to said key signal, whereby said special effects are obtained in which said compressed second picture is inserted into said chroma-key frame of said first picture.

The features and advantages of this invention will be understood from the detailed description of a preferred embodiment thereof, taken in conjunction with the accompanying drawings.

BRIEF DESCRIPTION OF THE DRAWINGS

In the drawings:

FIGS. 1A to 1E illustrate television pictures relating to video signals produced by a conventional system;

FIGS. 2A to 2D illustrate television pictures in accordance with the teachings of the present invention;

DETAILED DESCRIPTION

Figure 3:
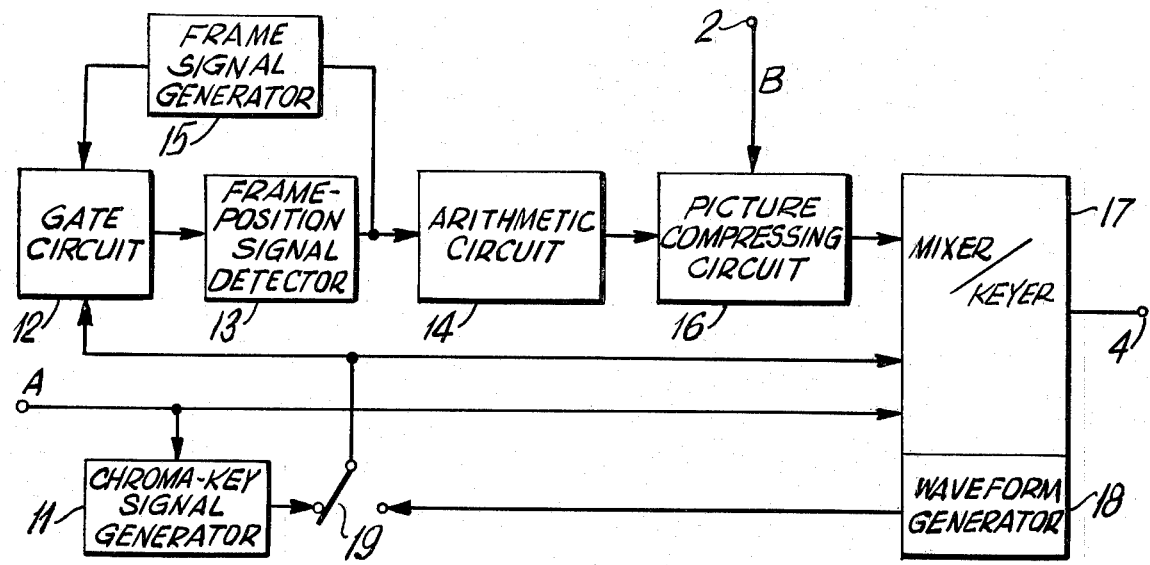
FIG. 3 is a block diagram of one embodiment of the invention.

With reference to FIG. 3, showing one embodiment of this invention, a first video signal A is supplied to first input terminal 1, and a second video signal B is supplied to a second input terminal 2. A chroma-key signal generator 11 generates, in response to the first video signal from the first input terminal 1, a chroma-key signal. The chroma-key signal is supplied to a gate circuit 12 via switch 19. The output of circumscribed frame signal generator 15 is also applied to gate circuit 12 and in response thereto the signal is deprived of its noise component. The output of gate circuit 12 is supplied to a frame-position signal detecting circuit 13 for detecting four values, i.e., those of the leftmost and rightmost points in the horizontal direction and the uppermost and lowermost points in the vertical direction of the chroma-key frame on the television picture.

Figure 4:
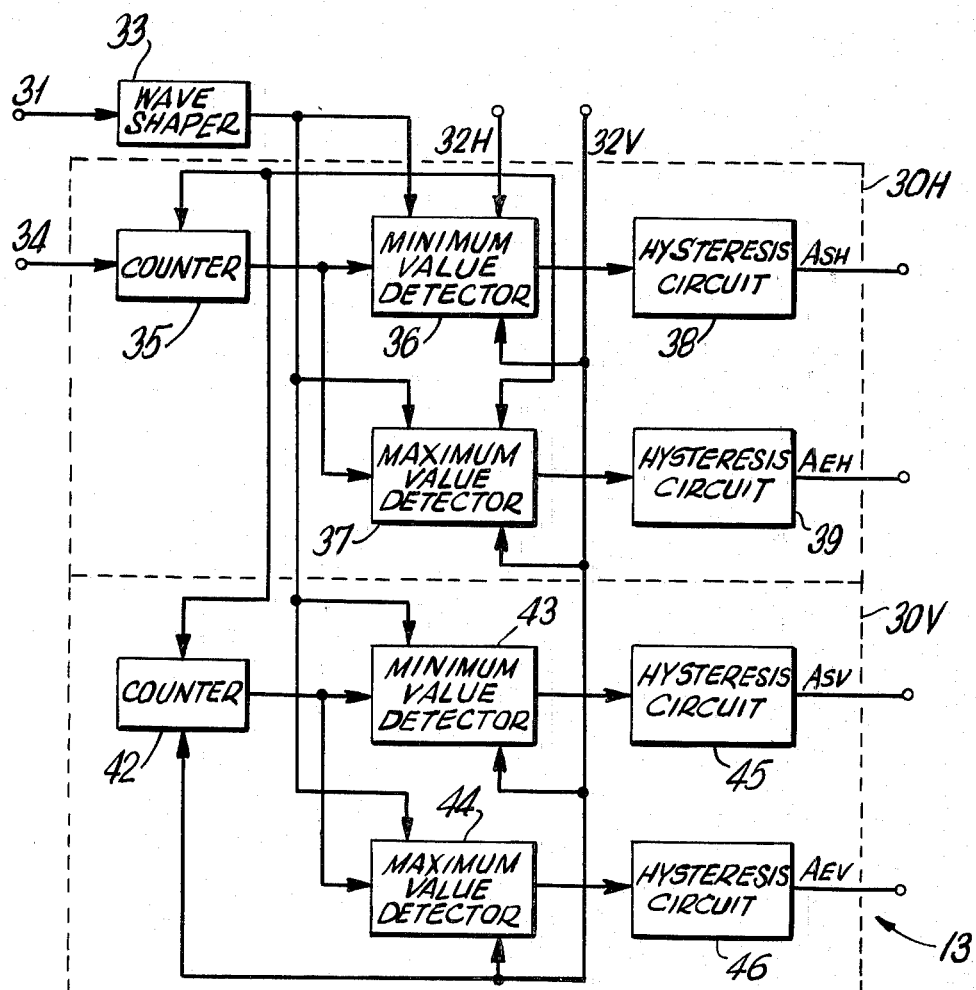
FIG. 4 is a block diagram of the frame-position signal detecting circuit used in the embodiment of FIG. 3.

One example of the frame position signal detecting circuit 13 is illustrated in FIG. 4. A chroma-key signal 31, whose noise component has been removed by the gate circuit 12, is shaped by a wave shaper 33, and applied to horizontal and vertical position detectors 30H and 30V.

In the horizontal position detector 30H, a counter 35, driven by clock pulses 34 to advance one state per clock pulse, is cleared by a horizontal synchronizing pulse 32H. Counter 35 applies the registered counts to a minimum-value detector 36 and to a maximum-value detector 37. The minimum-value detector 36 detects the counted value of the counter 35, at the leading edge of the chroma-key signal, once every horizontal scanning period. The detector 36 stores the detected value, which is then compared with the value for the immediately following horizontal scanning period and the smaller value is then stored as a new value. This procedure is repeated once every horizontal scanning period for an integral equal to one vertical scanning period. The last-held value in each vertical scanning period is then presented as the minimum horizontal value $A_{SH}$ representing the leftmost position of the chroma-key signal in the horizontal direction.

The maximum-value detector 37 holds the registered counts of counter 35 at the trailing edge of the chroma-key signal to detect the last-held value in each horizontal scanning period. The detector 37 also stores the detected value, which is then compared with the value for the immediately following horizontal scanning period and the greater value is stored as a new value. This procedure is repeated once every horizontal scanning period for an integral equal to one vertical scanning period. The last-held value in each vertical scanning period is presented as the maximum horizontal value $A_{EH}$ representing the rightmost position of the chroma-key signal in the horizontal direction. The detectors 36 and 37 are reset by the vertical synchronizing pulse 32V.

The detected minimum and maximum horizontal values are supplied to hysteresis circuits 38 and 39, respectively, which remove the jitter present at the leading and trailing edges of the chroma-key signal. A chroma-key signal, even if the original picture from which it is derived is motionless is susceptible to some jitter at its leading and trailing edges. Accordingly, the outputs of the minimum-value detector 36 and the maximum-value detector 37 are constantly fluctuating by small amounts. The hysteresis circuits 38 and 39, so composed that the outputs may not vary even if the inputs slightly fluctuate, greatly contribute to stabilization of the functioning of the system. The stabilized outputs $A_{SH}$ and $A_{EH}$ are fed to an arithmetic circuit 14 and the frame signal generator 15.

In the vertical position detector 30V, a counter 42, driven by the horizontal synchronizing pulse 32H to advance one state per horizontal period, is reset to zero by the vertical synchronizing pulse 32V. The counter 42 feeds the registered counts to a minimum-value detector 43 and a maximum-value detector 44. The minimum-value detector 43 detects the registered count of the counter 42 as the minimum vertical value $A_{SV}$ at the leading edge of the vertical component of the chroma-key signal once every vertical scanning period. The minimum vertical value represents the uppermost position of the chroma-key signal in the vertical direction. The maximum-value detector 44 stores the registered count of counter 42 at the trailing edge of the vertical component of the chroma-key signal to detect the last-held value in each vertical scanning period. The detected value is the maximum vertical value $A_{EV}$ representing the lowermost position of the chroma-key signal. The detected minimum and maximum vertical values are supplied to hysteresis circuits 47 and 48, respectively to remove jitter. The stabilized outputs $A_{SV}$ and $A_{EV}$ are supplied to the arithmetic circuit 14 and the frame signal generator 15.

The four values $A_{SH}$, $A_{EH}$, $A_{SV}$, and $A_{EV}$ obtained from the frame-position signal detector 13 represent the dimensions and position of the quadrilateral circumscribing the chroma-key frame. Thus in FIGS. 5A to 5C, reference numeral 20 indicates the dimensions of the standard picture, reference numeral 21 (21A, 21B, 21C) shows the chroma-key frame and the four detected values $A_{SH}$, $A_{EH}$, $A_{SV}$, and $A_{EV}$ correspond to the points of the four corners of the circumscribed frame 22 (22A, 22B, 22C). The four values are applied to the frame signal generator 15 (FIG. 3) to generate a frame signal corresponding to the frame 22. This frame signal is supplied to gate circuit 12 and in response thereto the noise component is removed from the chroma-key signal. The noise component outside frame 22 is thus eliminated.

Figure 5A:
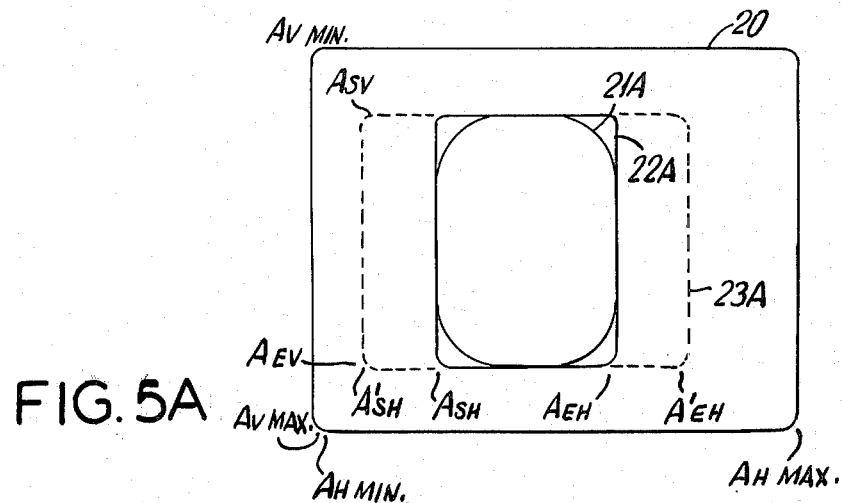
FIGS. 5A to 5C illustrate the relationship on the full picture, between various frames produced in accordance with one embodiment of this invention.
Figure 5B:
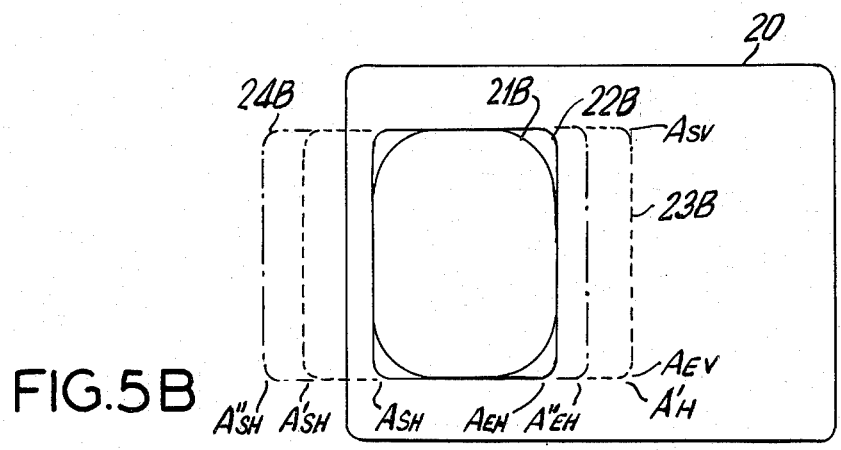
Figure 5C:
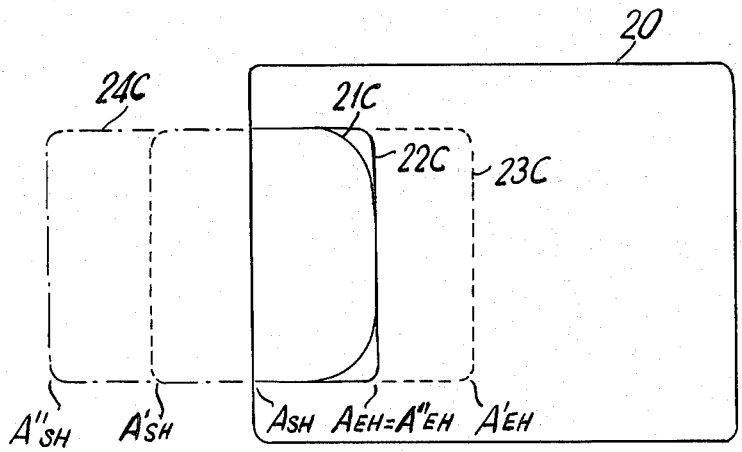

The four values are also fed to the arithmetic circuit 14 and corrected so as to make the corrected frame have the prescribed aspect ratio of 4:3. In FIGS. 5A to 5C, reference numerals 23A, 24B, and 24C show the corrected frame, i.e., an imaginary frame corresponding to the corrected four values.

The position signals for the imaginary frames 23A, 24B, and 24C are determined in the following manner: The vertical and horizontal dimensions of the circumscribed frame 22 are first determined, and the ratio $\gamma$ (1/aspect ratio) between them is calculated. Thus $$\gamma = (A_{EV} - A_{SV})/(A_{EH} - A_{SH})$$

When, the aspect ratio of the chroma-key frame on the television picture is 4:3, i.e., the ratio $\gamma$ is 0.75, the four values $A_{SH}$, $A_{EH}$, $A_{SV}$, and $A_{EV}$ are directly applied to the picture compressing circuit 16.

In the case where $\gamma \neq 0.75$, a primary correction is applied to the values $A_{SV}$ and $A_{EV}$, or $A_{SH}$ and $A_{EH}$. When the ratio $\gamma$ is smaller than 0.75, the value $A_{SV}$ is decreased and the value $A_{EV}$ is increased by equal quantities so as to make the ratio $\gamma = 0.75$. When the ratio $\gamma$ is greater than 0.75, the value $A_{SH}$ is decreased and the value $A_{EH}$ is increased by equal quantities to make the ratio $\gamma = 0.75$. FIGS. 5A to 5C show correction examples in which the ratio $\gamma$ is greater than 0.75. In FIGS. 5A to 5C, symbols $A'_{SH}$ and $A'_{EH}$ indicate the primarily-corrected values corresponding to the primarily-corrected frames 23A, 23B, and 23C. To enlarge the vertical dimension (when $\gamma$ is smaler than 0.75) or the horizontal dimension (when γ is greater than 0.75) by primary correction means that correction is accomplished so that the corrected frame 23 is always greater than the circumscribed frame 22.

When the primarily-corrected frame 23 is within the standard frame 20, i.e., when primarily-corrected minimum values $A'_{SH}$ and $A'_{SV}$ are equal to or greater than horizontal and vertical minimum values $A_H$min and $A_V$min of the standard frame 20, respectively, and when the primarily-corrected maximum values $A'_{EH}$ and $A'_{EV}$ are less than or equal to the horizontal and vertical maximum values $A_H$max and $A_V$max of the standard frame 20, respectively, as shown in FIG. 5A, the primarily-corrected values $A'_{SH}$, $A'_{EH}$, $A_{SV}$ and $A_{EV}$ (for γ>0.75) or $A_{SH}$, $A_{EH}$, $A'_{SV}$ and $A'_{EV}$ (for γ<0.75) are applied to the picture compressing circuit 16 as the corrected values.

When the primarily-corrected frame 23 extends outside the standard frame 20 as shown in FIGS. 5B and 5C, a secondary correction is applied to the primarily-corrected values so that the primarily-corrected frames 23B and 23C are laterally transferred off the standard frame 20 until those parts of the primarily-corrected frames, which are outside the standard frame, are doubled in length. Symbol 24B in FIG. 5B indicates the frame after the secondary correction, in which $A'_{SH}$ was modified to $A''_{SH}$ and $A'_{EH}$ to $A''_{EH}$. If the circumscribed frame 22C is in the peripheral area and in contact with the standard frame, for instance if the value of $A_{SH}$ is $A_H$min, the secondary correction is so accomplished that the whole primarily-conrrected frame is laterally transferred until $A''_{EH}$ equals $A_{EH}$.

In other words, in the case where $A'_{SH}<A_H$min, as shown in FIGS. 5B and 5C, the primarily-corrected frame is transferred to the left by $A_H$min$-A'_{SH}$ to provide secondary corrected values $A''_{SH}$ and $A''_{EH}$ as follows:

$A''_{SH}=2A'_{SH}-A_H$min $A''_{EH}=A'_{EH}+A'_{SH}-A_H$min

In the case where $A'_{EH}>A_H$max, the primarily-corrected frame is transferred to the right by $A'_{EH}-A_H$max, whereby the secondary-corrected values are provided as follows:

$A''_{SH}=A'_{SH}+A'_{EH}-A_H$max $A''_{EH}=2A'_{EH}-A_H$max

In the case where $A'_{SV}<A_V$min (γ<0.75), the primarily-corrected frame is transferred upward by $A_V$min$-A'_{SV}$, whereby the secondary-corrected values $A''_{SV}$ and $A''_{EV}$ are provided as follows:

$A''_{SV}=2A'_{SV}-A_V$min $A''_{EV}=A'_{EV}+A'_{SV}-A_V$min

In the case where, $A'_{EV}>A_V$max (γ<0.75), the primarily-corrected frame is transferred downward by $A'_{EV}-A_V$max, whereby the secondary-corrected values are provided as follows:

$A''_{SV}=A'_{SV}+A'_{EV}-A_V$max $A''_{EV}=2A'_{EV}-A_V$max

The secondary-corrected values thus obtained are fed to the picture compressing circuit 16.

Figure 6:
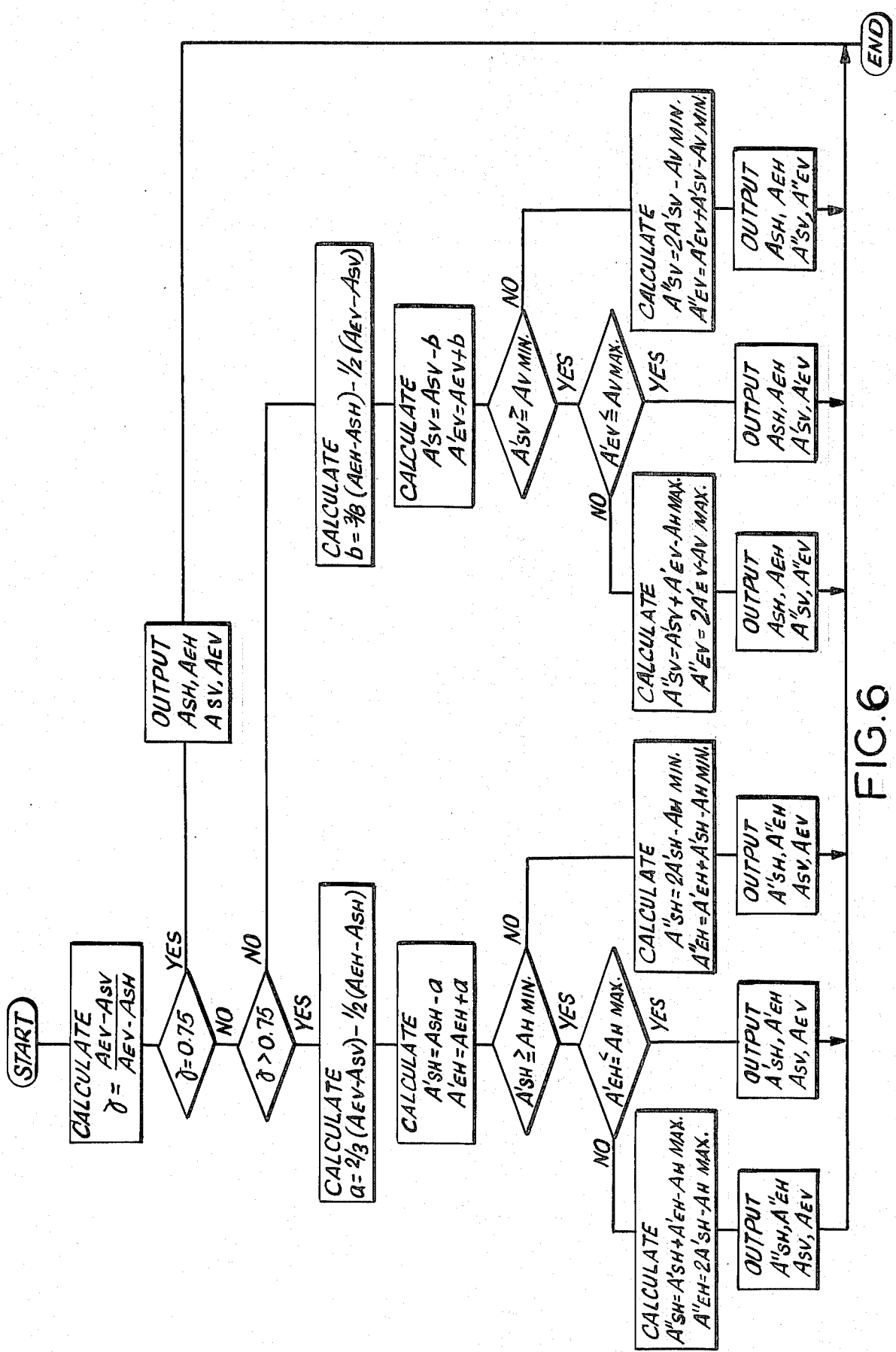
FIG. 6 illustrates a flow chart for the arithmetic circuit employed in the embodiment of FIG. 3.

The arithemetic circuit 14, for achieving the signal processing outlined above, may comprise a microprocessor, whose operation can be summarized in the form of the flow chart shown in FIG. 6.

The arithmetic circuit 14 supplies the picture compressing circuit 16 (FIG. 3) with various values needed for compressing a second video signal to a size corresponding to the imaginary frame. The output of the compressing circuit 16 is supplied to the mixer-keyer 17 as one of its inputs. The mixer-keyer 17 is also supplied with the first video signal A and the chroma-key signal, so that the compressed second video signal can be inserted into and keyed with the first video signal A to give the required output signal 4. The size of the picture compressed by the compressing circuit 16 corresponds to the size of the imaginary frame.

Figure 7:
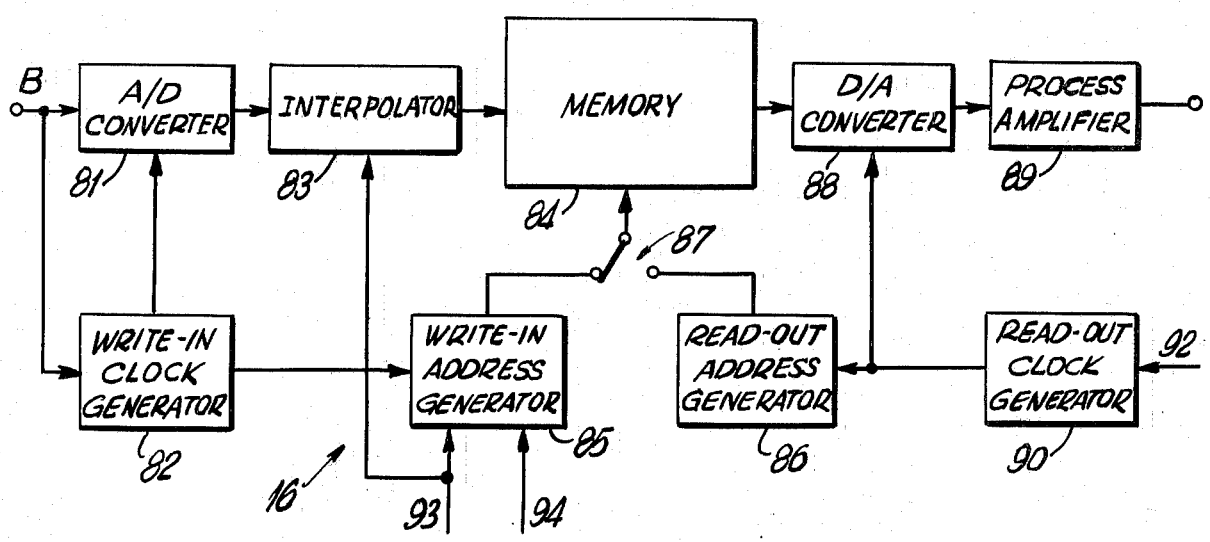
FIG. 7 is a block diagram of the picture compressing circuit employed in the embodiment of FIG. 3.

FIG. 7 is a schematic diagram of the picture compressing circuit 16, in which the second video signal B from the input terminal 3 (FIG. 3) is supplied to the analogue/digital converter 81 and converted into a PCM (pulse code modulation) signal. At the same time, the signal B is also supplied to the write-in clock generator 82 to generate a continuous wave phase-locked to the video system's color burst signal. This continuous wave is multiplied and sent out as a clock pulse for the analogue/digital converter 81. The output PCM signal from the analogue/digital converter 81 is supplied to the interpolating circuit 83.

The interpolating circuit 83 functions to alter the number of picture elements in the horizontal direction and the scanning lines in the vertical direction. When, for instance, a picture is to be compressed in a ratio of 1/1.5 in the horizontal direction, circuit 83 allows the first of the series of input picture elements to pass therethrough unchanged, creates by interpolation between the second and third picture elements, a picture element corresponding to exactly the middle of the two delivers the created picture element as the second of the output picture elements, and allows the fourth picture element to pass therethrough unchanged to constitute the third output picture element. By repeating this process, the number of output picture elements can be reduced to 1/1.5 of the number of input picture elements. This is equivalent to a 1.5-fold expansion of the sample gap in the analogue/digital converter. The output of the interpolating circuit 83 is written into the memory 84.

The foregoing control is accomplished by the output signals 93 and 94 from the arithmetic circuit 14. The signal 93 controls the gap between the picture elements newly created inthe interpolating circuit 83, and the signal 94 controls the write-in address generator 85 which generates an address when a signal is written into memory 84. The address value is increased by one each time a picture element arrives.

The readout address generator 86 generates the readout address to be used when a signal is read out of the memory 84. The switch 87 is intended to select the write-in address when a signal is to be written into memory 84 or select the read-out address when a signal is to be read out of memory 84. The read-out clock generator 90, using the reference sync signal 92 as input, generates the read-out clock to drive the read-out address generator 86 and the D/A converter 88. The D/A converter 88 converts the read out PCM signal from the memory 84 into an analogue signal. This analogue signal is fed to the process amplifier 89, amplified therein and turned out as output signal 91. This output signal, in the form of a picture signal compressed into a prescribed position and size, is supplied to the mixer-keyer 17 as one of its inputs.

As explained above, this system, with which it is possible to automatically compress an input picture into the size of a chroma-key signal supplied from outside, is very effective in the production of television programs. Although the chroma-key signal has been referred to in the above description as an example of the key signal, the principle of the present invention is also directly applicable to the wipe key or the like from the wave generator 18. Especially, even when the chroma-key frame is at an end of the standard frame, the system so functions as to make the compressed picture appear as if it were pasted on the chroma-key frame, resulting in a very natural-looking output picture.

What is claimed is:

1. A tracking system for producing special effects on a television picture said television picture comprised of a first picture and a second picture inserted into said first picture, said first and second pictures being represented by first and second video signals, respectively, wherein said first and second video signals have a predetermined aspect ratio, said system comprising:
    means for producing a key signal representing a key frame to be positioned on said first picture;
    means responsive to said key signal for producing a position signal representing a position of a circumscribed frame of said key frame;
    means responsive to said position signal for producing an imaginary-frame position signal, said imaginary-frame position signal representing an imaginary frame and said imaginary frame having said predetermined aspect ratio;
    means responsive to said second video signal and said imaginary-frame position signal for producing a compressed second video signal representing a compressed second picture, said compressed second picture being identical in size to said imaginary frame; and
    means responsive to said key signal for selectively combining said first video signal and said compressed second video signal, whereby said special effects are produced.

2. A tracking system in accordance with claim 1, wherein said imaginary-frame position signal producing means includes means for expanding one of a horizontal and vertical length of said circumscribed frame.

3. A tracking system in accordance with claim 2, wherein said position signal includes two vertical position signal values and two horizontal position signal values, said tracking system further including means responsive to said vertical position signal values and said horizontal position signal values for determining a control ratio, inversely proportional to said predetermined aspect ratio.

4. A tracking system in accordance with claim 3, wherein said imaginary-frame position signal producing means includes means for increasing selected ones of said vertical and horizontal position signal values in response to said control ratio being less than a predetermined value and for decreasing other selected ones of said vertical and horizontal position signal values in response to said control ratio being greater than a predetermined value.

5. A tracking system in accordance with claim 3, wherein said determining means comprises a microprocessor.

* * * * *